Sept. 27, 1927.
B. A. CAWTHON
1,643,541
STEREOPTICON FOR MOTION PICTURE PROJECTORS
Filed Nov. 4, 1925    2 Sheets-Sheet 1
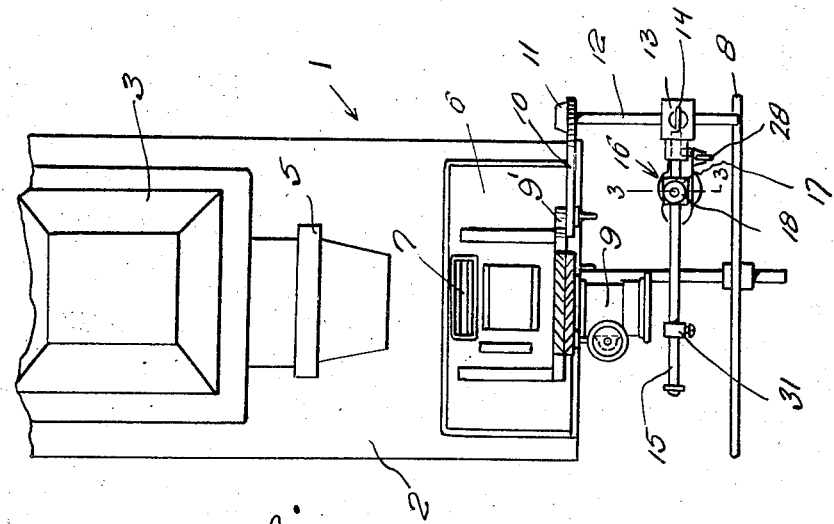
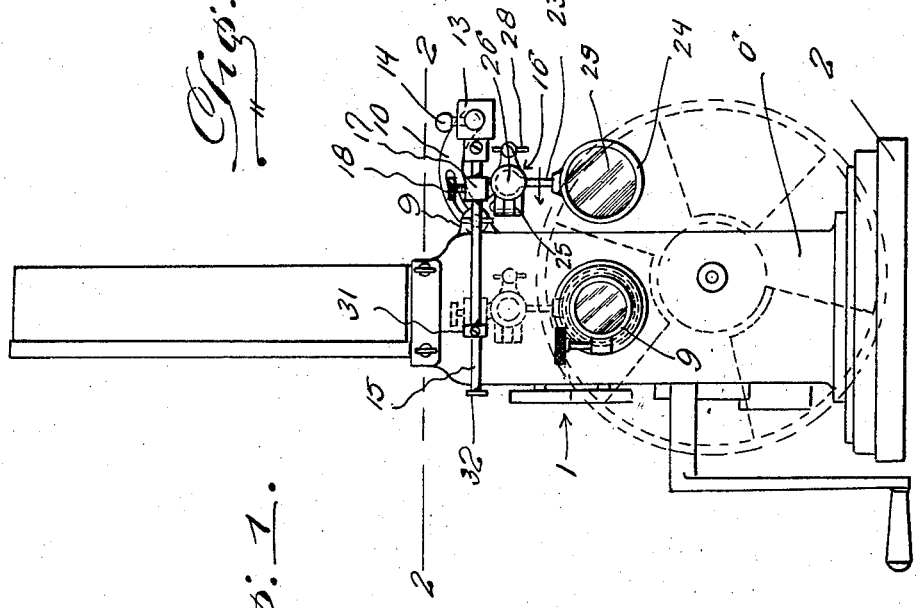
Inventor
B. A. Cawthon
By Clarence A. O'Brien
Attorney Sept. 27, 1927.
B. A. CAWTHON
1,643,541
STEREOPTICON FOR MOTION PICTURE PROJECTORS
Filed Nov. 4, 1925    2 Sheets-Sheet 2
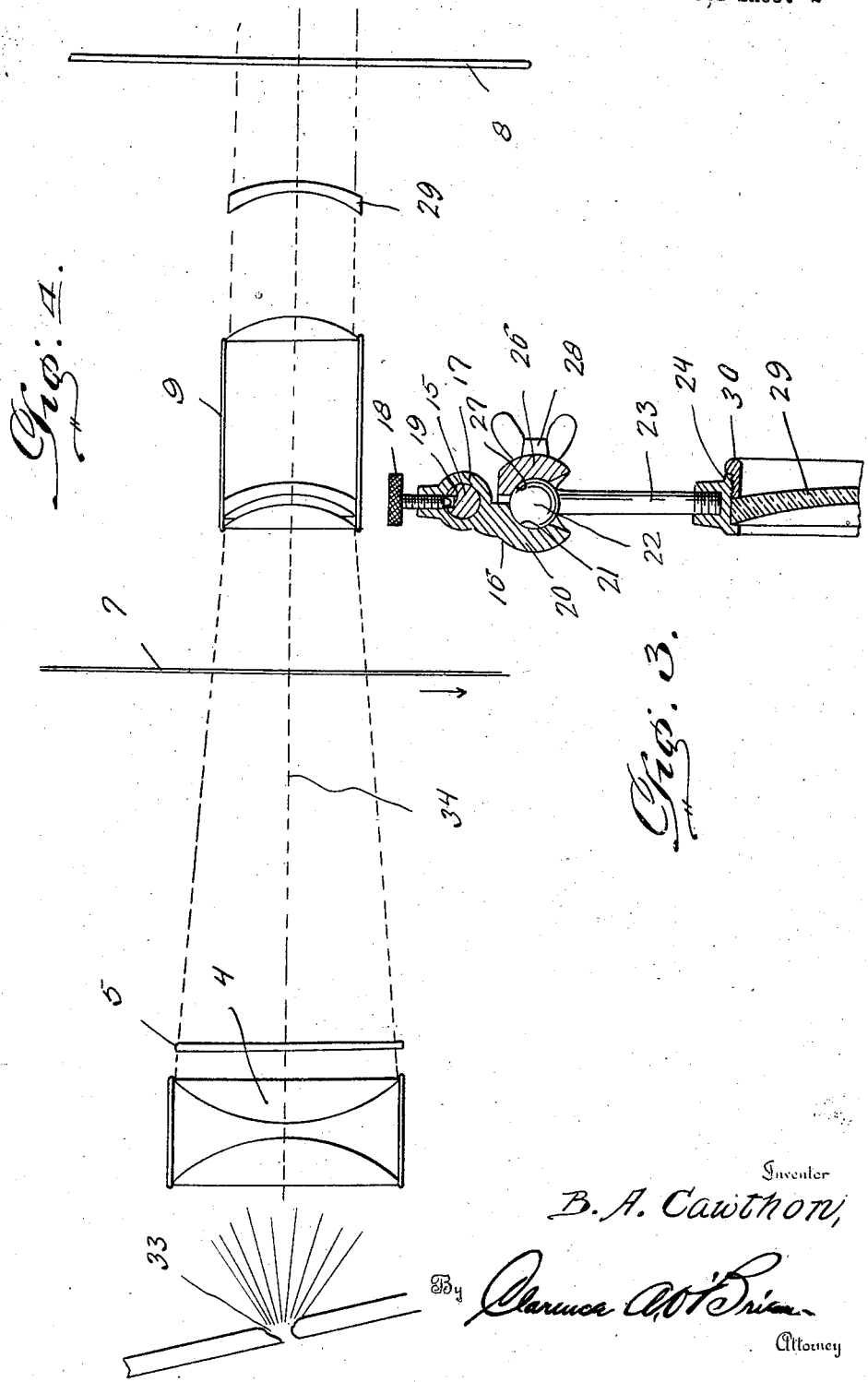
Inventor
B. A. Cawthon,
By Clarence A. O'Brien
Attorney Patented Sept. 27, 1927.

1,643,541

UNITED STATES PATENT OFFICE.

BENDER A. CAWTHON, OF JACKSONVILLE, FLORIDA.

STEREOPTICON FOR MOTION-PICTURE PROJECTORS.

Application filed November 4, 1925. Serial No. 66,730.

This invention relates to improvements in attachments for motion picture projectors and particularly to an attachment adapted to be attached to a motion picture projector for focusing stereopticon slides.

An object of the invention resides in providing an attachment for motion picture projectors adapted to be moved into the line of projection of the machine for motion pictures so that stereopticon slides positioned in said line of projection which normally are not focusable by the focusing lens for the motion picture may be properly focused in the same line of projection on a screen.

Another object of the invention eliminates the necessity for making the lamp housing of a motion picture machine movable so that it may be moved out of line with the projecting apparatus for motion pictures and into line with a separate projecting construction especially adapted for projecting stereopticon slides, and in eliminating said structure to provide for the projection of the slides on the same axis as the motion pictures when said motion pictures are removed from the film guide through the use of an attachment designed to cooperate with the focusing device for the motion pictures for focusing stereopticon slides on the same frames as the motion pictures.

The invention includes numerous other objects residing in the manner of carrying out the invention which are more particularly pointed out in the following detailed description and claims directed to a preferred form of the construction, it being understood, however, that various other methods may be employed which are clearly within the spirit and scope of the invention as herein set forth.

In the drawings forming part of this application:

Figure 1 is a front elevation of a motion picture machine with the attachment applied thereto.

Fig. 2 is a plan view of the motion picture machine with the attachment thereon as shown in Fig. 1.

Fig. 3 is a sectional view taken on line 3—3 of Fig. 2.

Fig. 4 is a diagrammatic view illustrating the relation of the attachment to the other projecting mechanism of the motion picture machine.

A motion picture machine of conventional form is indicated at 1 which includes a supporting base portion 2 on which is mounted the lamp housing 3 containing the source of light and mounting the condensing lenses 4 and the stereopticon slide holders 5. On the forward portion of the base 2 is mounted the housing 6 which houses the mechanism for feeding the film through the film guide 7 and for operating the usual shutter indicated at 8. This housing also mounts the usual lens units indicated at 9 which is adapted for adjustment through the changing of the relative position of the lenses for changing the focus in the line of projection of the light from the lamp house through the condensing lenses for projecting the motion pictures of a film passed through said guide onto a suitable screen.

This lens unit is ordinarily not adaptable for focusing the light sufficiently to focus the image of a slide mounted in the slide holder and therefore it has been found necessary in the types of motion picture machines now on the market to provide a separate projecting unit for stereopticon slides positioned in said slide holder which necessitates the movement of the lamp housing to one side of the housing 6 carrying the motion picture operating mechanism.

The present invention is designed to eliminate the movable structure for the lamp housing so that it may be made stationary in the line of projection of the light for the motion picture and which may be also used for projecting stereopticon slides by the use of the following described attachment.

A lug 9' is mounted on one side of the housing 6 and pivotally mounts a slotted arm 10 for relative adjustment with respect to said housing. The arm 10 as clearly illustrated in Figs. 1 and 2 is pivotally and slidably adjusted through the slotted connection with the lug 9' relative to said housing in order to permit the desired positioning of the structure carried thereby. The free end of the arm 10 is formed with a boss 11 through which extends an opening in which is mounted the rod 12 normally extending forwardly from the housing 6 and at one side thereof. A block 13 is slidably mounted on the rod 12 and is adapted to be secured in a desired position of adjustment for the set screw 14. The block 12 mounts a carrier rod 15 extending laterally with respect to the rod 12 and is adjustably mounted on the lens carrier indicated generally by the numeral 16.

This carrier member 16 includes a body member having a cylindrical portion 17 formed with a bore receiving said rod to permit the sliding movement of the carrier on the rod which is held against rotation on said rod through the medium of the set screw 18 having the end thereof projecting into the slot 19 in the rod 15 which also forms a means for locking the carrier in a desired position of adjustment on said rod.

From the portion 17 of the carrier, is an extension 20 formed with a semi-spherical seat 21 for the ball head 22 formed on the arm 23 extending from the lens carrier 24 The extension 20 on the carrier also pivotally mounts at 25 a pivoted member 26 having a cooperating semi-spherical seat 27 to engage the head 22. A bolt 28 extends through an opening in the opposite end of the pivoted member 26 and is threadedly mounted in an extension on the projection 20 for locking the pivoted member in engagement with the head 22 in such a manner as to permit the free universal movement of the head 22 in the socket formed by the pivoted member 26 and the projection 20 or for locking said head against movement therein in order to hold the lens carrier in a desired position of adjustment. A concavo-convex lens 25 is mounted in the carrier 24 and retained therein by the retaining ring 26 threadedly mounted in the carrier 24 as clearly shown in Fig. 3.

With the parts arranged as above described and with particular reference to Figs. 1 and 2, it will be seen that the carrier 16 can be slidably moved back and forth on the rod 15 to position the lens 29 in the line of the axis of projection of the lens unit 9 for the motion pictures. This position is illustrated particularly in dotted lines in Fig. 1 and after the proper adjustments for the lens has been obtained, a stop 31 is pivotally mounted on the rod 15 and is secured in position to determine the position of the carrier for the proper adjustment of the lens. In this way, the lens can be moved in or out of focus or of the line of the axis of projection of the focusing unit 9 at will and without requiring adjustment for each successive time that the lens is positioned in said line of projection. A suitable collar or plate 32 is mounted on the free end of the rod 15 to prevent the disengagement of the carrier 16 and the stop collar 31 from the rod.

With this invention applied to a moving picture machine as shown in Figs. 1 and 2 and positioned as shown in full lines in these figures, the projector may be used for projecting motion pictures in the usual manner through the normal operation of the conventional projecting apparatus of the machine. When it is desired to project stereopticon slides, in a machine of this character, it is ordinarily necessary to move the lamp housing to another projecting apparatus in one side of the housing 6 for the reason that the axis of projection for the motion pictures in which the lenses 9 are mounted is not of such designs that the lenses in the unit 9 can be operated to focus a stereopticon slide in view of the difference of position between the film guide 7 and the slide holder 5. It has been therefore impossible to focus stereopticon slides in the holder 5 of motion picture machines with the lens units 9 as a result of which the separate stereopticon projecting structure has been applied to the motion picture machine at considerably additional cost.

With the present invention, the lamp 29 in the holder 24 may be moved into the axis of projection through the lens unit 9 which is axis of projection for motion pictures and when constructed in a predetermined manner which has been found to be of concavo-convex form then the curvature of the lens surfaces are on predetermined arcs, the lens 29 when positioned in proper distance in front of the unit 9 will cooperate with the unit for focusing the image of the picture on a stereopticon slide sufficient in the holder 5 and thus provide an attachment for motion picture machines which may be manufactured at small cost in comparison with the cost of the stereopticon attachments now in use.

Fig. 4 illustrates the relative position of the source of light which is diagrammatically illustrated at 33 the projecting axis being indicated by the dotted line 34, while the condensing lenses focusing in and other objects in the line of projection are indicated at their relative positions. It is to be understood that in projecting a stereopticon slide that the shutter 8 is positioned so as not to interfere with the projecting thereof.

It will thus be seen that an exceedingly simple and yet efficient device has been provided in order that the lens 29 may be mounted and adjusted to the proper position on a motion picture machine for carrying out the above results in the focusing in a stereopticon slide so that the machine may be readily used for projecting either motion pictures or stereopticon slides on the same projection axis without the use of separate projecting apparatus or the movement of the lamp housing for cooperation therewith.

Having thus described my invention, what I claim as new is:—

1. A stereopticon attachment for motion picture projectors, comprising an arm adjustably connected to a projector, a rod mounted on one end of the arm and extending laterally therefrom, a block member slidably and rotatably adjustable on said rod, a carrier rod mounted in said block member, a carrier member slidably mounted on said carrier rod, means for limiting the sliding movement of said carrier member, and a lens carrier detachably and universally mounted on said carrier member.

2. A stereopticon attachment for motion picture projectors, comprising a substantially universally adjustable structure mounted on the projector having a carrier rod extending transversely to the vertical plane of the projection axis of said projector, a carrier member slidably adjustable on said carrier rod, means for limiting the adjustment of said carrier member to provide an operative and inoperative position for a lens, and a lens carrier universally mounted on said carrier member.

3. A stereopticon attachment for motion picture projectors, comprising a supporting structure having universally adjustable parts attached to a projector, and having a carrier rod projecting laterally across the plane of projection of said projector, a carrier member slidably mounted on said carrier rod, means for limiting the movement of said member on said rod, a lens carrier having a projection provided with an enlarged substantially spherical head portion at the end thereof, said carrier member being formed with a socket to receive a portion of said head, and a pivoted retaining member mounted on said carrier member, and means for locking said retaining member to said carrier member to detachably and adjustably mount said lens carrier thereon through engagement with said spherical head.

In testimony whereof I affix my signature.

BENDER A. CAWTHON.